3,402,168
MONOAZO PIGMENTS CONTAINING 2,3-HY-
DROXYNAPHTHOIC ACID AMIDE
Karl Ronco and Willy Mueller, Riehen, Switzerland, assignors to Ciba Limited, Basel, Switzerland, a Swiss company
No Drawing. Filed June 22, 1965, Ser. No. 466,088
Claims priority, application Switzerland, June 26, 1964, 8,415/64
6 Claims. (Cl. 260—204)

ABSTRACT OF THE DISCLOSURE

Monoazo dyestuff pigments of the formula

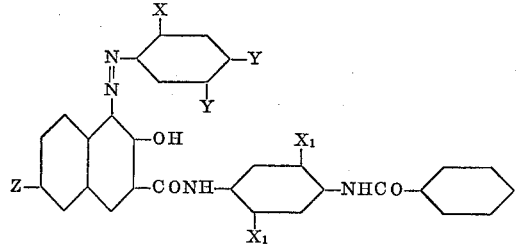

in which X is halogen, alkyl, alkoxy or nitro, one Y is halogen, alkyl, alkoxy or nitro and the other Y is hydrogen or alkyl, Z is hydrogen, halogen or alkoxy and the two symbols $X_1$ are halogen, alkyl or alkoxy, are useful for coloring plastic masses, and lacquers in red shades of excellent fastness to light and migration.

---

The present invention provides monoazo dyestuff pigments of the formula (1)

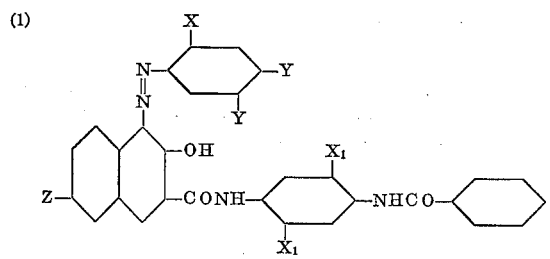

in which X represents a halogen atom or an alkyl or alkoxy group or a nitro group, one Y represents a halogen atom or an alkyl or alkoxy group or a nitro group and the other Y represents a hydrogen atom or an alkyl group, Z represents a hydrogen or halogen atom or an alkoxy group and the two symbols $X_1$ represent halogen atoms or alkyl or alkoxy groups.

Since the colorants of the invention are pigments it is naturally essential that they do not contain groups imparting solubility in water, especially acid groups imparting solubility in water, for example, sulfonic acid groups and carboxylic acid groups.

The new colorants are obtainable when (a) a carboxylic acid halide of the formula (2)

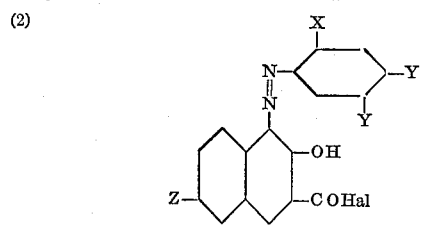

is condensed with an amine of the formula (3)

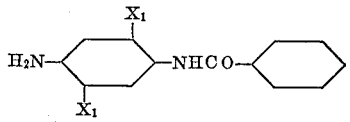

or (b) the diazo compound of an amine of the formula (4)

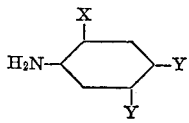

is coupled with a naphthol of the formula (5)

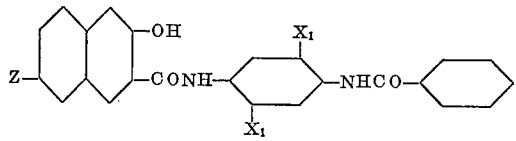

It is the carboxylic acid chlorides that are preferably used in method (a) of the process of the invention. The corresponding carboxylic acids are obtainable by coupling the diazo compound of an amine of the Formula 4 with 2:3-hydroxynaphthoic acid, 2-hydroxy-6-bromo-3-naphthoic acid and 2-hydroxy-6-methoxy-3-naphthoic acid.

The following amines may be mentioned as diazo components:

2-chloro-4-methylaniline,
2-chloro-4-methoxyaniline,
2-chloro-4-nitroaniline,
2:4-dichloroaniline,
2:5-dichloroaniline,
2:5-dibromoaniline,
2-chloro-5-methylaniline,
2-chloro-5-methoxyaniline,
2-chloro-5-nitroaniline,
2:4-dimethylaniline,
2-methyl-4-chloroaniline,
2-methyl-4-methoxyaniline,
2-methyl-4-nitroaniline,
2-methyl-5-chloroaniline,
2-methyl-5-methoxyaniline,
2-methyl-5-nitroaniline,
2-methoxy-4-chloroaniline,
2-methoxy-4-methylaniline,
2-methoxy-4-nitroaniline,
2-methoxy-5-chloroaniline,
2-methoxy-5-methylaniline,
2-methoxy-5-nitroaniline,
2-nitro-4-chloroaniline,
2-nitro-4-methylaniline,
2-nitro-4-methoxyaniline,
2:4-dinitroaniline,
2-nitro-5-chloroaniline,
2-nitro-5-methylaniline,
2-nitro-5-methoxyaniline and
2-methoxy-4-chloro-5-methylaniline.

The azo dyestuff carboxylic acids so obtained are treated with agents capable of converting carboxylic acids into their halides, for example, their chlorides or bromides, such agents being, in particular phosphorus halides, for example, phosphorus pentabromide, phosphorus trichloride or phosphorus pentachloride, phosphorus oxyhalides and preferably thionyl chloride.

The treatment with the said acid halogenating agents is advantageously carried out in an inert organic solvent, for example, dimethyl formamide, chlorobenzenes, for example, monochlorobenzene or dichlorobenzene, toluene, xylene or nitrobenzene; in the case of the last five solvents it may also be carried out in the presence of dimethyl formamide.

In the preparation of the carboxylic acid halides it is generally advantageous first to dry the azo compounds, which are prepared in aqueous medium, or to free them from water azeotropically by boiling in an organic solvent. If desired, the said azeotropic drying process may be carried out immediately prior to the treatment with the acid halogenating agents.

The azo dyestuff carboxylic acid chlorides so obtained are condensed with monoamines of the Formula 3, in which formula $X_1$ has the meaning given above.

The following amines may be mentioned as examples: 2:5-dichloro-4-benzoylamino-aniline, 2:5-dimethyl-4-benzoylamino-aniline and 2:5-dimethoxy-4-benzoylamino-aniline.

Condensation between the carboxylic acid halides of the kind defined above and the amines is advantageously carried out in an anhydrous medium. Under these conditions it proceeds surprisingly easily, even at temperatures within the boiling range of common organic solvents, for example, toluene, monochlorobenzene, dichlorobenzene, trichlorobenzene, nitrobenzene, and the like. To accelerate the reaction it is generally advantageous to use an agent capable of binding acid, for example, anhydrous sodium acetate or pyridine. Some of the colorants so obtained are crystalline and some are amorphous, and they are generally obtained in a very good yield and in a pure state. It is advantageous first to isolate the acid chlorides obtained from the carboxylic acids. In some cases, however, isolation of the acid chlorides can be omitted without harm, and condensation carried out immediately subsequent to formation of the carboxylic acid chlorides.

In method (b) of the process of the invention the new colorants are obtained by coupling the diazo compound of an amine of the Formula 4 with a naphthol of the Formula 5.

Coupling is effected by gradually adding an aqueous alkaline solution of the coupling component to an acid solution of the diazonium salt. The amount of alkali hydroxide used to dissolve the coupling component should be such that it is sufficient to neutralize the mineral acid liberated from the diazonium salt during coupling. Coupling is advantageously carried out at a pH value of 4 to 6. The pH value is advantageously adjusted by the addition of a buffer. Suitable buffers are, for example, the salts of formic acid, phosphoric acid or especially acetic acid, especially the alkali salts of these acids. The alkaline solution of the coupling component advantageously contains a wetting, dispersing or emulsifying agent, for example, an aralkyl sulfonate such as dodecylbenzene sulfonate or the sodium salt of 1:1'-naphthylmethane sulfonic acid, polycondensation products of alkylene oxides, for example, the product obtained by reacting ethylene oxide with para-tertiary-octylphenol, as well as the alkyl esters of sulforicinoleates, for example, n-butylsulforicinoleates. The dispersion of the coupling component can also advantageously contain protective colloids, for example, methyl cellulose or small amounts of inert organic solvents sparingly soluble or insoluble in water, for example, halogenated or nitrated aromatic hydrocarbons, for example, benzene, toluene, xylene, chlorobenzene, dichlorobenzene or nitrobenzene, as well as aliphatic halogenated hydrocarbons, for example, carbon tetrachloride or trichloroethylene, and organic solvents miscible with water, for example, acetone, methylethyl ketone, methanol, ethanol and isopropanol.

Coupling can also advantageously be carried out by continuously combining an acid solution of the diazonium salt with an alkaline solution of the coupling component in a mixing nozzle, during which process coupling takes place instantaneously. Care must be taken to ensure that diazo component and coupling component are present in the mixing nozzle in equimolecular proportions, it having been observed that a small excess of coupling component is advantageous. The simplest method of effecting this is by control of the pH value of the liquid in the mixing nozzle. Furthermore, both solutions should be in a state of violent turbulence in the mixing nozzle. The colorant dispersion so formed is drawn off continuously from the mixing nozzle and the colorant is isolated by filtration.

The new colorants are valuable pigments that can be used for a very wide variety of purposes; for example, they can be used in a state of fine division for the spin-coloration of viscose, cellulose ethers and esters, polyamides, polyurethanes and polyesters, as well as in the preparation of colored lacquers and lake formers, solutions and products made from cellulose acetate, nitrocellulose, natural resins and synthetic resins, for example, polymerization resins and condensation resins, for example, aminoplasts, alkyd resins, phenoplasts, polyolefines, for example, polystyrene, polyvinyl chloride, polyethylene, polypropylene, polyacrylonitrile, rubber, casein, silicones and silicone resins. They can also be used with advantage in the preparation of colored pencils, cosmetic preparations and laminated sheet material.

The following examples illustrate the invention. Unless otherwise stated, the parts and percentages are by weight.

EXAMPLE 1

53.0 parts of the colorant, obtained by coupling 5-chloro-2-methoxy-1-aminobenzene diazotized in aqueous hydrochloric acid and sodium nitrite with 2:3-hydroxynaphthoic acid, in admixture with 500 parts of orthodichlorobenzene, 25 parts of thionyl chloride and 2.5 parts of dimethyl formamide are heated for one hour at 110 to 115° C. while stirring. After cooling the reaction mixture, the homogeneously crystalline monocarboxylic acid chloride of the colorant is isolated by filtration, washed with cold ortho-dichlorobenzene and benzene and dried in vacuo at 50 to 60° C.

6.75 parts of the chloride so obtained in admixture with 4.5 parts of 2:5-dimethyl-4-benzoylamino-aniline and 400 parts of ortho-dichlorobenzene are heated for 14 hours at 140 to 145° C. Subsequently, the crystalline, sparingly soluble pigment is isolated by filtration while hot, washed successively with hot ortho-dichlorobenzene, boiling alcohol and hot water and then dried in vacuo at 70 to 80° C. The colorant so obtained of the formula

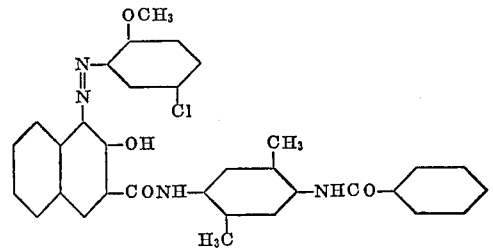

is a red pigment which is sparingly soluble to insoluble in the usual solvents and which colors polyvinyl chloride film and also lacquers red tints possessing an excellent fastness to light, migration and over-stripe bleeding.

The azo dyestuff monocarboxylic acids obtainable from the mononuclear diazo components in Column I of the following table and the coupling components in Column II can be reacted via the monoazo dyestuff monocarboxylic acid chlorides with 1 mol of the aromatic binuclear monamines indicated in Column III in the manner described in the first and second paragraphs above. The tints obtained with pigments in polyvinyl chloride film are given in Column IV.

the symbol Z in the formula indicated represents a hydrogen atom.

| | I | II | III | IV |
|---|---|---|---|---|
| 1 | 2:5-dichloroaniline | 2:3-hydroxynaphthoic acid | 2:5-dimethyl-4-benzoylamino-aniline | Red. |
| 2 | 5-nitro-2-methoxy-aniline | do | 2:5-dichloro-4-benzoylamino-aniline | Red-violet. |
| 3 | do | do | 2:5-dimethoxy-4-benzoylamino-aniline | Brown. |
| 4 | 4-nitro-2-methoxyaniline | do | 2:5-dimethyl-4-benzoylamino-aniline | Blue-red. |
| 5 | 5-nitro-2-methyl-aniline | do | 2:5-dichloro-4-benzoylamino-aniline | Red. |
| 6 | do | do | 2:5-dimethyl-4-benzoylamino-aniline | Red. |
| 7 | 5-chloro-2-methyl-aniline | do | do | Scarlet. |
| 8 | 4-methoxy-2-nitroaniline | do | do | Blue-red. |
| 9 | 2:5-dichloraniline | 2-hydroxy-6-bromo-3-naphthoic acid | do | Do. |
| 10 | do | 2-hydroxy-6-methoxy-3-naphthoic acid | do | Claret. |

EXAMPLE 2

7.9 parts of 5-chloro-2-methoxy-1-aminobenzene are diazotized in the usual manner with aqueous hydrochloric acid, ice and sodium nitrite.

Separately, 21.5 parts of 2:5-dimethyl-1-(2-hydroxy-3'-naphthoylamino) - 4 - benzoylaminobenzene are dissolved in 50 parts of ethanol, 10 parts of sodium hydroxide solution of 30% strength, 200 parts of water and 100 parts of ethylene glycol monoethyl ether. 1 part of the product obtained by condensing 8 mols of ethylene oxide with 1 mol of para-tertiary-octylphenol is added to the solution, and susbequently the naphthol is precipitated with 70 parts of glacial acetic acid while stirring well. Coupling is effected by addition of the diazo solution described in the first paragraph while maintaining a pH value of 3 to 4 and keeping the temperature at 35° to 40° C. Stirring is continued for 2 hours at the same temperature to complete coupling. The pigment suspension so formed is rendered acid to congo paper by the addition of hydrochloric acid and the pigment is isolated by filtration. The filter residue is washed with hot water until chlorine ions are no longer detectable in the filtrate. After drying in vacuo at 80 to 90° C., the red pigment of the formula given in Example 1 is obtained in good yield. It colors plastics, for example, polyvinyl chloride, and lacquers scarlet tints possessing a good fastness to migration, to overstripe bleeding and to light.

EXAMPLE 3

A mixture comprising 65 parts of stabilized polyvinyl chloride, 35 parts of dioctyl phthalate and 0.2 part of the colorant obtained in the manner described in the second paragraph of Example 1 is worked to and fro for 7 minutes on a two-roller mill at 140° C. A red film possessing a very good fastness to light and to migration is obtained.

What is claimed is:
1. A monoazo pigment of the formula

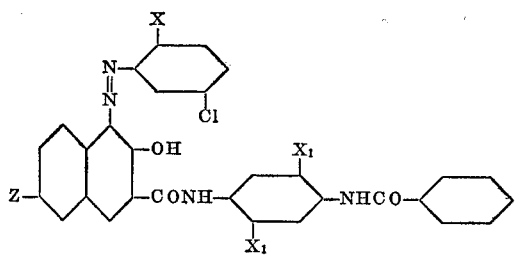

in which X and $X_1$ are chlorine or methyl and Z is hydrogen, bromine or lower alkoxy.

2. Monazo pigments as claimed in claim 1, wherein

3. The dyestuff of the formula

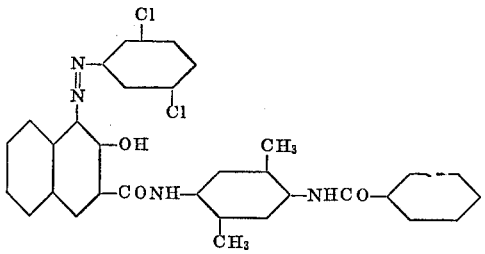

4. The dyestuff of the formula

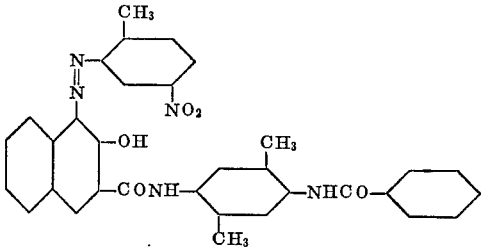

5. The dyestuff of the formula

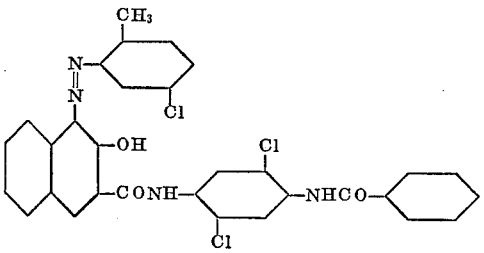

6. The dyestuff of the formula

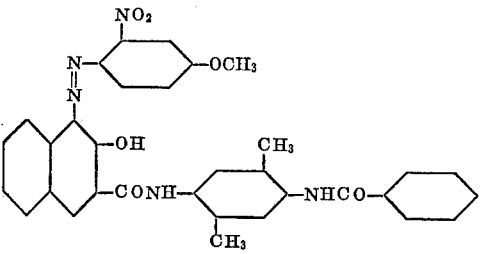

References Cited
UNITED STATES PATENTS

| | | | |
|---|---|---|---|
| 1,718,882 | 6/1929 | Schwenk et al. | 260—204 XR |
| 1,947,550 | 2/1934 | Hitch | 260—204 XR |
| 2,088,726 | 8/1937 | Sexton | 260—204 XR |

FLOYD D. HIGEL, *Primary Examiner.*